(12) United States Patent
Finger et al.

(10) Patent No.: US 7,428,813 B2
(45) Date of Patent: Sep. 30, 2008

(54) INTERNAL COMBUSTION ENGINE COMPRISING AN EXHAUST GAS TURBOCHARGER

(75) Inventors: Helmut Finger, Leinfelden-Echterdingen (DE); Erwin Schmidt, Baltmannsweiler (DE); Siegfried Sumser, Stuttgart (DE)

(73) Assignee: Daimler AG, Stuttgart (DE)

( * ) Notice: Subject to any disclaimer, the term of this patent is extended or adjusted under 35 U.S.C. 154(b) by 120 days.

(21) Appl. No.: 11/150,700

(22) Filed: Jun. 11, 2005

(65) Prior Publication Data

US 2005/0229597 A1    Oct. 20, 2005

Related U.S. Application Data

(63) Continuation-in-part of application No. PCT/EP03/13138, filed on Nov. 22, 2003.

(30) Foreign Application Priority Data

Dec. 12, 2002    (DE)    ............................... 102 58 022

(51) Int. Cl.
- *F02D 23/00*    (2006.01)
- *F02B 33/44*    (2006.01)
- *F02M 25/07*    (2006.01)
- *F16K 11/085*    (2006.01)

(52) U.S. Cl. ................ 60/602; 60/605.2; 137/625.47

(58) Field of Classification Search ............... 60/602, 60/605.2; 137/625.47; *F16K 11/085*
See application file for complete search history.

(56) References Cited

U.S. PATENT DOCUMENTS

| | | | | |
|---|---|---|---|---|
| 1,384,645 A * | 7/1921 | Sullivan | ................ | 137/625.47 |
| 1,958,228 A * | 5/1934 | Beardsley | ............... | 137/625.47 |
| 2,749,941 A * | 6/1956 | Gardner | ................. | 137/625.43 |
| 2,781,056 A * | 2/1957 | Carufel | .................. | 137/625.47 |
| 3,055,404 A * | 9/1962 | Anderson | ................... | 141/144 |
| 3,721,265 A * | 3/1973 | Hoffland | ................ | 137/625.47 |
| 4,146,055 A * | 3/1979 | Ryder et al. | ........... | 137/625.47 |
| 5,867,987 A | 2/1999 | Halimi et al. | ................. | 60/602 |
| 5,893,392 A * | 4/1999 | Spies et al. | ............ | 137/625.47 |
| 5,943,864 A * | 8/1999 | Sumser et al. | ................ | 60/602 |
| 6,196,266 B1 * | 3/2001 | Breda | .................... | 137/625.47 |
| 6,216,459 B1 * | 4/2001 | Daudel et al. | .............. | 60/605.2 |
| 6,223,534 B1 | 5/2001 | Erdmann et al. | ............. | 60/602 |
| 6,694,735 B2 * | 2/2004 | Sumser et al. | ............. | 60/605.2 |
| 7,051,527 B2 * | 5/2006 | Schmid et al. | ................ | 60/602 |
| 2008/0000229 A1 * | 1/2008 | Kuspert et al. | ............. | 60/605.2 |

FOREIGN PATENT DOCUMENTS

| | | |
|---|---|---|
| CH | 496 194 | 10/1970 |
| CH | 537 544 | 7/1973 |
| DE | 76 05 236 U * | 6/1976 |

(Continued)

*Primary Examiner*—Thai-Ba Trieu
(74) *Attorney, Agent, or Firm*—Klaus J. Bach

(57) ABSTRACT

In an internal combustion engine having an exhaust gas turbocharger with an exhaust gas inlet structure including two exhaust gas flow passages in communication with two exhaust ducts via a rotary cylinder valve for controlling the exhaust gas flow, the valve includes two inlet openings for directing the flow to the inlet flow passages of the turbine and a recess which when disposed over the exhaust gas flow passages permits exhaust gas to flow from one to the other of the exhaust gas ducts, the interior of the valve being in communication with a bypass line for bypassing the turbine.

4 Claims, 3 Drawing Sheets

FOREIGN PATENT DOCUMENTS

| | | |
|---|---|---|
| DE | 196 18 160 | 11/1997 |
| DE | 197 40 609 | 12/1998 |
| DE | 198 15 234 | 10/1999 |
| DE | 198 25 920 | 12/1999 |
| DE | 19836 677 | 2/2000 |
| EP | 0 401 615 | 12/1990 |
| EP | 0 666 440 A1 * | 8/1995 |
| JP | 62103418 A * | 5/1987 |
| WO | WO 01/09487 | 2/2001 |

* cited by examiner

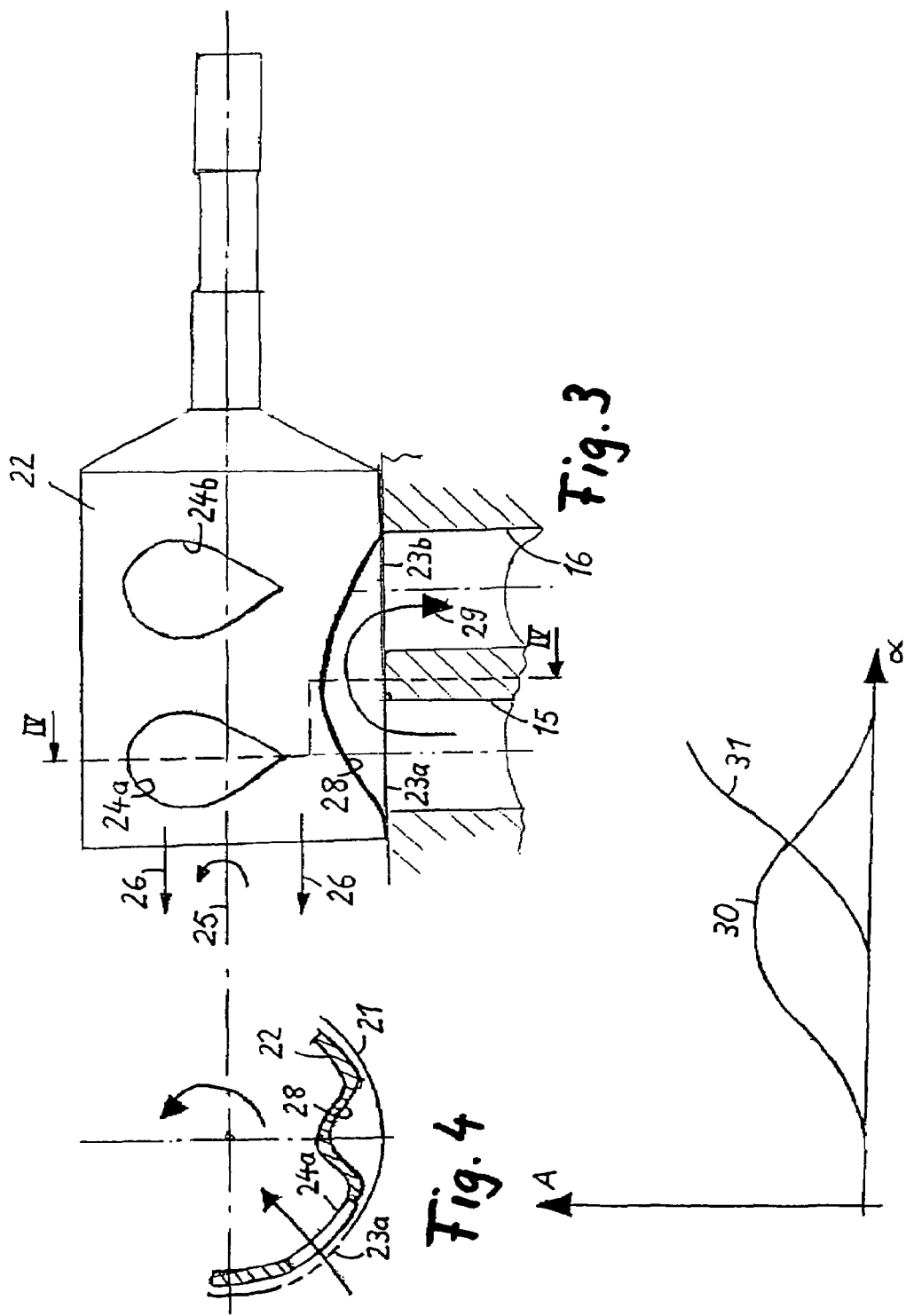

INTERNAL COMBUSTION ENGINE COMPRISING AN EXHAUST GAS TURBOCHARGER

This is a Continuation-In-Part Application of International Application PCT/ep2003/013138 filed Nov. 22, 2003 and claiming the priority of German application 102 58 022.7 filed Dec. 12, 2002.

BACKGROUND OF THE INVENTION

The invention relates to an internal combustion engine having an exhaust gas turbocharger with an exhaust gas turbine in the engine exhaust duct and a compressor driven by the exhaust gas turbine and being arranged in the engine intake line.

The publication DE 198 57 234 C2 describes such a supercharged internal combustion engine, the exhaust gas turbine of which has a divided spiral duct with two separate exhaust gas flow passages, each exhaust gas flow passage being fed with exhaust gases from one cylinder bank respectively of the internal combustion engine via one exhaust pipe of the exhaust line. The two exhaust pipes are connected to one another by a valve device making it possible to direct exhaust gas from one to the other of the two exhaust pipes. In addition a bypass is provided which bypasses the exhaust gas turbine and can likewise be opened and closed by the valve device.

Exhaust gas is directed from one to the other of the two exhaust pipes particularly in the powered operating mode of the internal combustion engine, in order to equalize or limit the pressure in the exhaust pipes. The two exhaust gas flow passages in the exhaust gas turbine have different flow cross-sections so that a greater back pressure can be obtained in the exhaust pipe with the smaller exhaust gas flow cross-section than in the exhaust pipe with the larger exhaust gas flow cross-section. This greater back pressure can be utilized to advantage for an exhaust gas recirculation device, which comprises a recirculation pipe between the exhaust pipe for the pipe with the smaller exhaust gas flow cross-section and the intake line, together with a return valve arranged in the recirculation pipe. It is noted here, however, that particularly in high engine speed ranges the quantity of exhaust gas returned must be limited, which can be achieved by directing exhaust gas from one to the other of the two exhaust pipes.

On the other hand, there is also a bypass for bypassing the exhaust has turbine which is advantageously opened during engine braking, in order to be able to control the turbine inlet pressure of the exhaust gas and hence also the required engine braking power.

The publication DE 196 18 160 C2 discloses an internal combustion engine having an exhaust gas turbocharger, the exhaust gas turbine of which has two exhaust gas inlet flow passages, which are located upstream of the turbine wheel. The two exhaust gas inlet flow passages are each supplied with exhaust gas by an exhaust pipe from the cylinder outlets of the internal combustion engine and a recirculation pipe of an exhaust gas recirculation device, via which exhaust gas from the exhaust line is returned into the intake line in specific operating states of the internal combustion, branching off from the exhaust pipe supplying the smaller exhaust gas inlet flow passage. In the turbine housing upstream of the turbine wheel the two exhaust gas flow passages are separated by a dividing wall, into which a valve device is integrated, via which the two exhaust gas flow passages can each be connected to a bypass bypassing the turbine wheel. In this way the exhaust gas can be blown off, bypassing the turbine wheel.

The valve device is embodied as a rotary slide valve having a cylindrical valve body, in the valve outer casing with axially extending communication openings, which can be adjusted between an open position communicating with the exhaust gas flow passages, and a closed position. Rotation of the valve body results either in blowing-off, exhaust gas whereby the gas content in the two exhaust gas flows is discharged via the bypass, or in a separation of the two flows, in which blowing-off is prevented and the exhaust gas must flow through the turbine inlet passages into the turbine.

The configuration shown in DE 196 18 160 C2 on the other hand does not permit an equalization of pressure between the two exhaust pipes or the two exhaust gas flows. There is no valve body position with the two opposing, axially extending communication openings which will only permit and exhaust gas flow transfer but no blowing-off of exhaust gas.

The publication U.S. Pat. No. 6,223,534 B1 discloses an engine braking device for an internal combustion engine having an exhaust gas turbocharger, the exhaust gas turbine of which is also of two-flow design and can be connected by a valve device to a bypass line. The valve device comprises a hollow cylindrical valve body having communication openings, which in an open position of the valve body connect the exhaust gas flow passages to the bypass line.

Even in the arrangement of U.S. Pat. No. 6,223,534 B1, it is only possible either to blow off the content of both exhaust gas flow passages via the bypass line or to shut the valve device off, preventing blow-off and directing the exhaust gas flow of both exhaust gas flow passages to the turbine wheel. No further possible settings, and in particular flow transfers between the two exhaust gas flow passages, are provided.

Based on this state of the art, it is the object of the invention to use simple design measures to construct a supercharged internal combustion engine having a two-flow exhaust gas turbine, in such a way that it is possible, depending on the current operating state of the internal combustion engine, not only to direct exhaust gases from one to the other of the two exhaust gas flow passages, but also to blow these gases off through a bypass line bypassing the exhaust gas turbine.

SUMMARY OF THE INVENTION

In an internal combustion engine having an exhaust gas turbocharger with an exhaust gas inlet structure including two exhaust gas flow passages in communication with two exhaust ducts via a rotary cylinder valve for controlling the exhaust gas flow, the valve includes two openings for directing the flow to the inlet flow passages or the turbine and a recess which, when disposed over the exhaust gas flow passages, permits exhaust gas to flow from one to the other of the exhaust gas ducts, the interior of the valve being in communication with a bypass line for bypassing the turbine.

In the internal combustion engine according to the invention the valve device arranged between the two exhaust pipes is embodied as a rotary slide valve and comprises a rotatably mounted, hollow cylindrical valve body. At least one communication opening, which connects the outside of the valve body to the valve body interior, is formed into the outer casing of the valve body. The valve body can be rotated between different positions. In the open position two outflow openings, which are assigned to the two exhaust pipes respectively, align with the communication opening in the valve body, so that the two exhaust pipes are connected to one another and pressure can be equalized.

The bypass bypassing the exhaust gas turbine is axially connected to the valve body interior and can be opened and shut off by an additional, controllable bypass valve. With the bypass valve closed, blowing off via the bypass is prevented; if the rotary slide valve is at the same time set to its open position, this permits an equalization of pressure between the exhaust pipes assigned to the two exhaust gas flows. If, on the other hand, the bypass valve is also opened with the rotary slide valve in the open position, exhaust gases are blown off via the bypass, thus bypassing the exhaust gas turbine. In this case the exhaust gas content is suitably blown off from both exhaust pipes. It may also be appropriate, however, to provide separately regulable valves for the two outflow openings of the exhaust pipes.

The degree of alignment between the communication opening in the valve body outer casing and the two outflow openings of the exhaust pipes, and hence also the level of the exhaust gas mass flow conducted between the pipes and/or to be blown off can be regulated via the position of the rotary slide valve.

In a particularly advantageous embodiment the bypass valve is integrated into the valve device and is in particular actuated by a rotational movement of the valve body. This is preferably achieved in that a trough-shaped connecting recess, which is hermetically separated from the valve body interior, is formed in the valve body outer casing. This connecting recess is embodied, for example, as a depression-like connecting trough on the valve body outer casing, set back from the peripheral surface of the valve body. In a first open position of the valve device the connecting recess connects the two outflow openings of the exhaust pipes, the hermetic sealing off from the valve body interior ensuring that it is only possible to conduct exhaust gases from one to the other of the two exhaust pipes and that blowing off via the bypass, which is connected to the valve body interior, is prevented. If the exhaust gas is to be diverted via the bypass on the other hand, the valve body is brought into its second open position, in which the communication opening aligns with one or with both of the outflow openings, so that one exhaust pipe or both exhaust pipes is/are connected to the valve body interior and hence also to the bypass.

The connecting recess and the communication opening or communication openings are suitably arranged at different angular positions of the valve body, so that turning of the valve body causes either the connecting recess or the communication opening to move into a connecting position with the outflow openings. In this way a simple rotational movement serves for switching between blowing off or transferring the exhaust gases, or a shut-off position.

The internal combustion engine is advantageously equipped with an exhaust recirculation device and/or an exhaust gas turbine with variable turbine geometry for variable regulation of the effective turbine inlet cross-section. In the powered drive mode the exhaust gas recirculation device serves to transfer a controllable exhaust gas mass flow from the exhaust line to the intake line, with the result, in particular, that even at full load it is possible to achieve a reduction in the exhaust emissions. The variably adjustable turbine geometry can advantageously be used, both in the powered mode and in the engine braking mode to boost the drive or braking power.

The invention and suitable embodiments thereof will be described below in greater detail on the basis of the accompanying drawings:

BRIEF DESCRIPTION OF THE DRAWINGS

FIG. 3 is a schematic representation of a valve device embodied as rotary slide valve, having a connecting recess in the form of a depression formed into the valve body outer casing and two communication openings, which are assigned to two outflow openings of the two exhaust pipes, FIG. 4 shows a cross-sectional area taken along the section line IV-IV in FIG. 3, and FIG. 5 shows a diagram of the curve of the opening cross-section for the transfer of exhaust gases between the two exhaust pipes and blowing off exhaust gas via the bypass as a function of the angular adjustment of the rotary slide valve.

DESCRIPTION OF PREFERRED EMBODIMENTS

Figure 1:
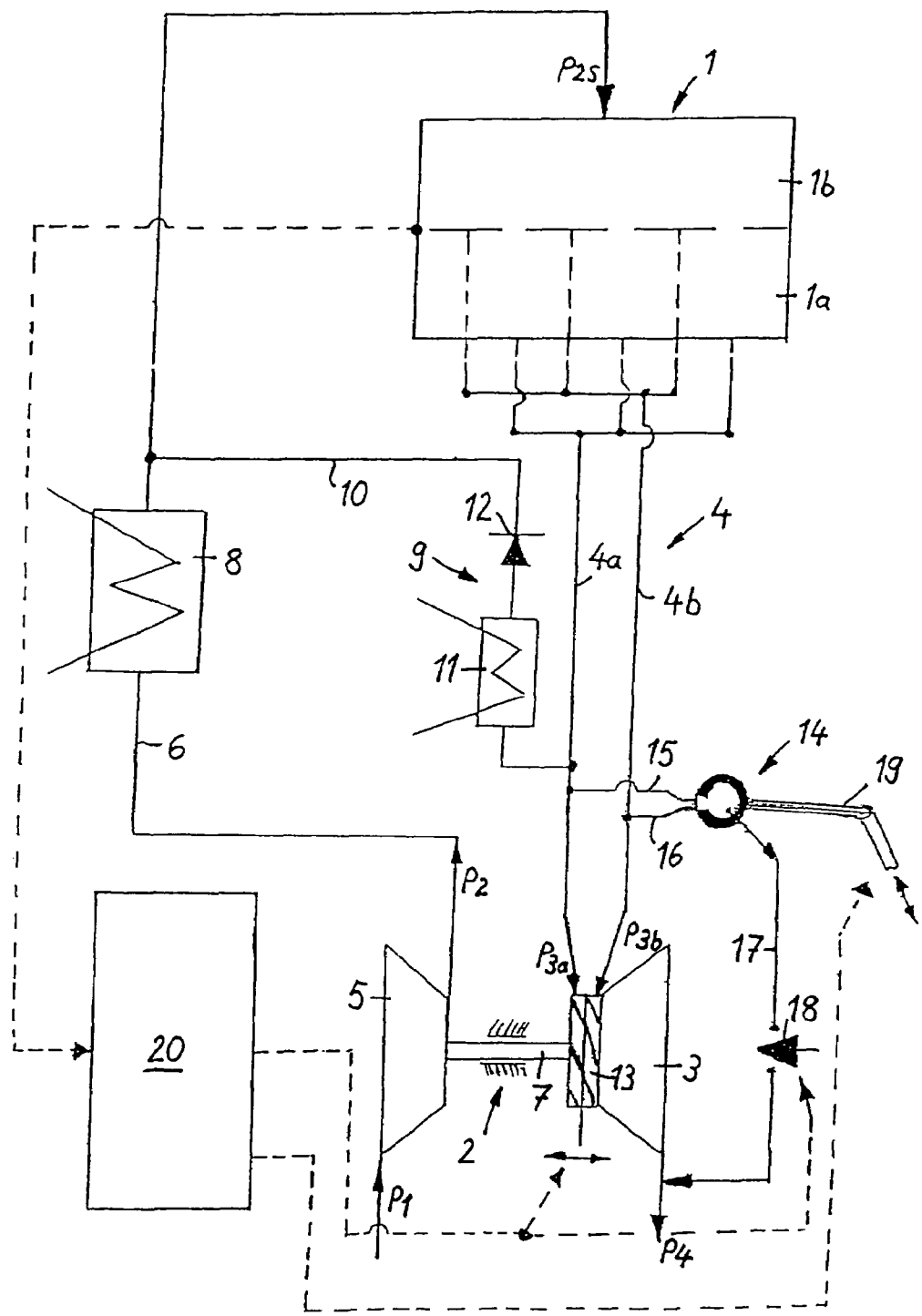
FIG. 1 shows schematically a supercharged internal combustion engine comprising an exhaust gas turbine with two exhaust gas flows, which are each connected to an exhaust pipe, each exhaust pipe extending from one bank of cylinders of an internal combustion engine, and having a valve device, which serves for regulating the transfer of exhaust gas between the two exhaust gas flow passages and/or for blowing off the gas into a bypass line bypassing the exhaust gas turbine.

In the drawings identical parts are provided with the same reference numerals.

The internal combustion engine 1 represented in FIG. 1 is a spark-ignition engine or a diesel engine having two cylinder banks 1a and 1b, the exhaust gas from which is conducted away by exhaust pipes 4a and 4b of an exhaust line 4. An exhaust gas turbocharger 2, which comprises an exhaust gas turbine 3 in the exhaust line 4 and a compressor 5 in the intake line 6, is assigned to the internal combustion engine 1, the compressor 5 being driven via a shaft 7 from the exhaust gas turbine 3. In the operation of the internal combustion engine ambient air at the ambient pressure $p_1$ is taken in by the compressor 5 and compressed to an increased pressure $p_2$, at which the combustion air is delivered to an intercooler 8. After cooling in the intercooler 8, the combustion air is fed as charge air at the charge pressure $p_{2S}$ to the cylinder inlets of the internal combustion engine 1. Upstream of the exhaust gas turbine, the exhaust gases to be fed to the exhaust gas turbine 3 via the two exhaust pipes 4a and 4b are subject to the back pressure $p_{3a}$ and $p_{3b}$. After expansion in the exhaust gas turbine 3 the exhaust gas is discharged at the expansion pressure $p_4$.

The internal combustion engine 1 is equipped with an exhaust gas recirculation device 9, by way of which the exhaust gases from the exhaust line 4 can be transferred to the intake line 6 downstream of the intercooler 8. The exhaust gas recirculation device 9 comprises a return pipe 10, which branches off from the first exhaust pipe 4a and opens into the exhaust line 6. An exhaust gas cooler 11 with a shut-off valve 12 on the outlet side is arranged in the return pipe 10. The shut-off valve 12 prevents any backflow of exhaust gas into the exhaust pipe and is appropriately embodied as a passive component. It may also be appropriate, however, to make the shut-off valve 12 of regulable design, so that this can be opened and closed as a function of variable parameters and operating variables of the internal combustion engine. The valve 12 may also be a butterfly valve.

The exhaust gas turbine 3 is equipped with a variable turbine geometry 13, by means of which the effective turbine inlet cross-section can be adjusted between a minimum, restricted position and a maximum, open position. The regulation of the variable turbine geometry serves to influence the behavior of the internal combustion engine both in the powered drive mode and in the engine braking mode.

The exhaust gas turbine 3 is of two-flow design and comprises an exhaust gas collecting chamber which is arranged upstream of the turbine wheel and which in particular takes the form of a spiral duct and comprises two exhaust gas flow passages. Each exhaust gas flow passage is connected to an exhaust pipe 4a and 4b respectively.

Pressure in the two exhaust pipes 4a and 4b can be equalized by means of a valve device 14. The exhaust gas mass flow to be blown off via a bypass 17 to the exhaust gas turbine 3 can also be regulated by means of the valve device 14. The valve device 14 is coupled by two connecting pipes 15 and 16 to the exhaust pipes 4a and 4b. The bypass 17, which extends back into the exhaust line downstream of the exhaust gas turbine 3, branches off from the valve device 14. In the bypass 17 is a controllable bypass valve 18, which is likewise assigned to the valve device 14. The bypass valve 18 may be designed separately from the casing of the valve device 14 or it may also be integrated into the casing of the valve device.

The valve device 14 can be controlled in combination with the bypass valve 18 so as to permit only a transfer of exhaust gases between the two exhaust pipes 4a and 4b. For this purpose the valve device 14 is brought into an open position through the operation of an actuator 19 and the bypass valve 18 is at the same time closed, so that only an exchange of gas between the exhaust pipes 4a and 4b is permitted via the connecting pipes 15 and 16 and the valve device 14, but the bypass 17 is closed. In the closed position of the valve devices 14 any exchange of gas between the exhaust pipes 4a and 4b and any blowing off of gas via the bypass 17 is prevented. If both the valve device 14 and the bypass valve 18 are set to the open position on the other hand, exhaust gas is blown off from both exhaust pipes 4a and 4b via the bypass 17 into the exhaust line downstream of the exhaust gas turbine 3.

A feedback and control unit 20, which serves to regulate the regulable units of the internal combustion engine as a function of variable parameters and operating variables, is also assigned to the internal combustion engine 1. This relates in particular to the variable turbine geometry 13, the valve device 14 and the bypass valve 18.

Figure 2:
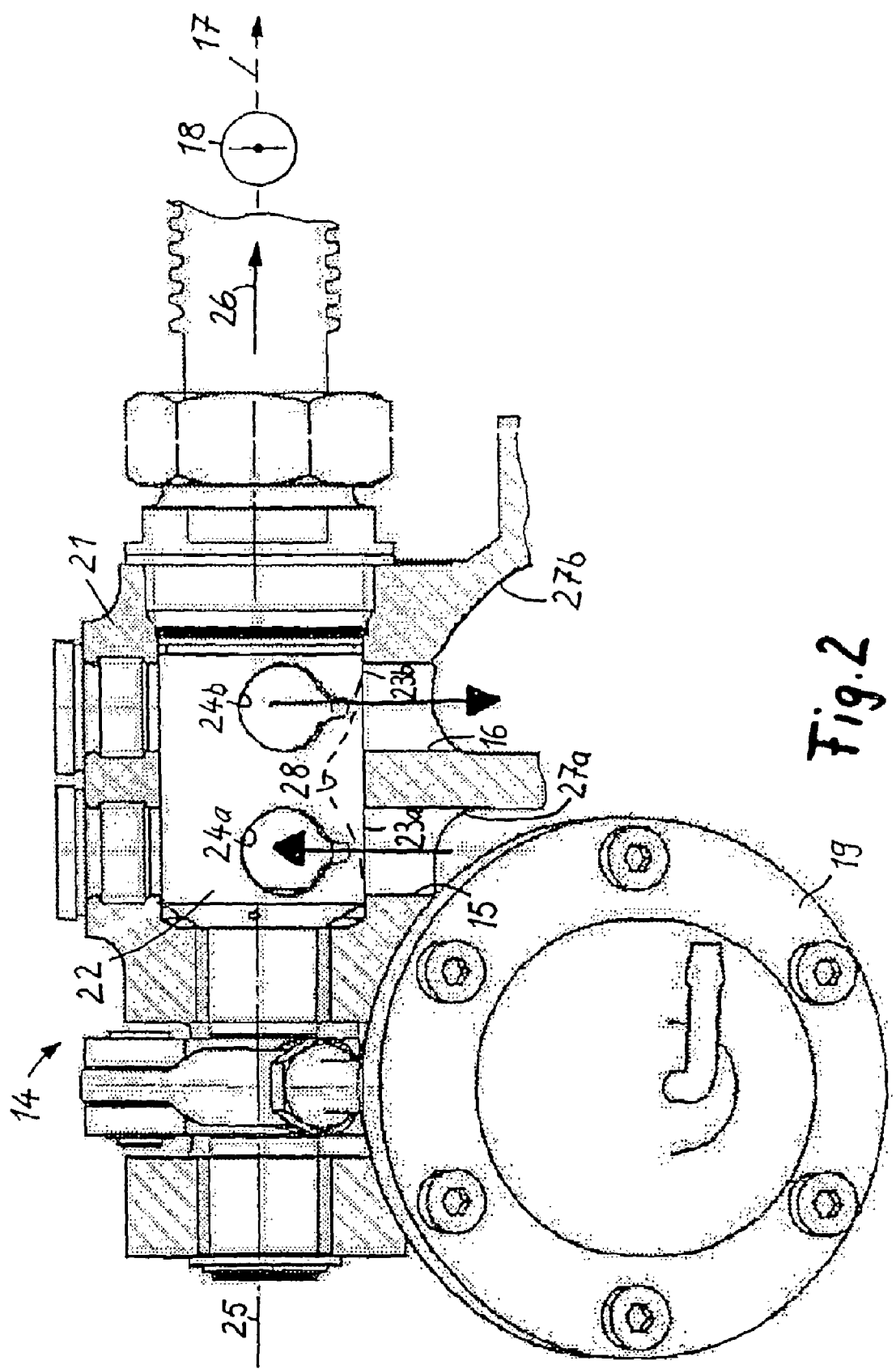
FIG. 2 shows a valve device, which permits a transfer of exhaust gases between the exhaust pipes and blowing off exhaust gas, thus bypassing the exhaust gas turbine.

The valve device 14 represented in FIG. 2 is embodied as a rotary slide valve and comprises a hollow cylindrical valve body 22 rotatably mounted in a valve housing 21, in the outer casing of which valve body two communication openings 24a and 24b are provided, which, by rotation about the valve body longitudinal axis 25 can be brought into a position of alignment with two outflow openings 23a and 23b, which represent the orifice openings of the connecting pipes 15 and 16 in the valve housing 21. By a rotation of the valve body 22 about its longitudinal axis 25, by operation of the actuator 19, the valve body 22 can be adjusted between an open position, in which its communication openings 24a and 24b align with the outflow openings 23a and 23b, and a closed position, in which the communication openings are not connected to the outflow openings, so that the outflow openings are closed. In the open position, on the other hand, communication with the valve body interior is possible by way of the outflow openings 23a and 23b and the communication openings 24a and 24b.

The bypass 17 is axially connected to the valve body interior by the bypass valve 18 arranged therein. With the bypass valve 18 opened, the gas content of the valve body interior can flow out axially via the bypass valve 17 in the direction of the arrow 26. With the bypass valve 18 closed and the valve device 14 at the same time in the open position, on the other hand, an axial outflow via the bypass valve 17 is prevented. With the valve device 14 in the open position and the bypass valve 18 closed, a gas exchange may take place, according to the arrows entered, between the connecting pipes 15 and 16 and hence between the two exhaust pipes of the internal combustion engine via the outflow openings 23a and 23b and the communication openings 24a and 24b and the valve body interior.

The valve device 14 may also be arranged directly on the inlet side of the exhaust gas turbine, particularly in such a way that the valve housing 21 is directly connected to the turbine housing. The outflow openings 23a and 23b and the connecting pipes 15 and 16 in this case branch off from the exhaust gas flow passages 27a and 27b of the exhaust gas turbine. The two exhaust gas flow passages 27a and 27b are in particular of different sizes, which leads to an increased exhaust gas back pressure in the area of the smaller exhaust gas flow passage 27a and the exhaust pipe assigned to this exhaust gas flow passage. If the valve body 22 is in the open position with the bypass closed, this leads to an equalization of pressure and a blown transfer of gas from the smaller exhaust gas flow 27a into the larger exhaust gas flow 27b and the exhaust pipes respectively assigned thereto, according to the arrows entered.

FIGS. 3 and 4 show a modified embodiment of a valve body 22 of a valve device. In addition to the two communication openings 24a and 24, a connecting recess 28 also extends into the peripheral surface of the valve body 22, although the recess, in contrast to the communication openings, does not extend through the wall of the hollow cylindrical valve body 22 and therefore does not communicate with the valve body interior. The connecting recess 28 is instead is formed into the peripheral surface in the form of a connecting trough similar to a depression, in such a way that the recess 28 is set radially back from other sections of the peripheral surface. On the peripheral surface of the valve body 22 the connecting recess 28 extends so far in the direction of the longitudinal axis that, in a communicating or open position the two axially offset outflow openings 23a and 23b communicate via the connecting recess 28, so that a gas exchange between the connecting pipes 15 and 16 can take place in the direction of the arrow 29. In this first open position of the valve body 22 the connection to the valve body interior and hence in the direction of the bypass is prevented. It is possible to dispense with an additional bypass valve. The bypass valve function is therefore integrated into the valve device, the bypass being shut off either via the closed position of the valve body 22 or via the first open position of the valve body (connection opening 28 aligning with the outflow openings 23a and 23b) and the bypass being opened via the second open position of the valve body (communication openings 24a and 24b aligning with the outflow openings 23a and 23b).

The connecting recess 28 and the communications openings 24a and 24b are situated at different angular positions on the periphery of the valve body outer casing, so that when the valve body 22 is turned about its longitudinal axis 25, either the connecting recess 28 connects with the outflow openings 23a and 23b in a first communicating or open position, or the two communication openings 24a and 24b align with the outflow openings 23a and 23b in a second open position and the exhaust gas can be diverted in the bypass. In all other angular positions of the valve body 22 the peripheral surface of the valve body closes the outflow openings 23a and 23b; the valve device is therefore situated in its closed position The diagram shown in FIG. 5 represents the curve for the transfer cross-section 30 and blow-off cross-section 31 as a function of the angular position α of the valve body of the valve device. The transfer cross-section 30 corresponds to the degree of alignment of the connecting recess 28 in the peripheral surface of the valve body with the two outflow openings 23a and 23b. When the valve body 22 is turned from its closed position into its first open position, in which the connecting recess 28 comes into alignment with the outflow openings 23a and 23b, the curve 30 rises as the degree of alignment with the outflow openings increases to a maximum. Thereafter the curve drops again. In the area approximating to the maximum for the curve 30 the communication openings 24a and 24b, for example, also come into alignment with the outflow openings 23a and 23b; this is represented by the rise of the curve 31 characterizing the blow-off cross-section.

What is claimed is:

1. An internal combustion engine having two cylinder banks (1a, 1b) with separate exhaust pipes (4a, 4b) for supplying exhaust gas from the two cylinder banks (1a, 1b) to an exhaust gas turbocharger, which, comprises an exhaust gas turbine (3) with a turbine wheel an which is connected to the exhaust pipes (4a, 4b) so as to be driven by exhaust gas from the internal combustion engine (1), and a compressor (5) arranged in the intake line (6) of the internal combustion engine (1) and driven by the exhaust gas turbine (3), an exhaust gas inlet structure arranged upstream of the turbine wheel in the exhaust gas turbine (3) and comprising two exhaust gas flow passages, which each communicate with one exhaust pipe (4a, 4b) of the exhaust line (4), each having a valve device (14) upstream of the exhaust gas turbine, for directing the exhaust gas mass from one to the other of the two exhaust pipes (4a, 4b) or blown off into e bypass (17) bypassing the exhaust gas turbine (3), the valve device (14) being a rotary slide valve and comprising a rotatably mounted valve body (22) adjustable between an open position and a closed position and extending into a valve body outer casing with at least one communication opening (24a, 24b), the valve body being hollow cylindrical and having two spaced communication openings extending through the wall of the hollow cylindrical body which, in the open position of the valve, are in alignment with the two exhaust gas line openings (23a, 23b), e the bypass line (17) being axially in communication with the interior of the valve body for discharging exhaust gas through the turbine, the valve body (22) including a connecting recess (28) forming a curved passage between the two exhaust gas lines (4a, 4b) on the outside of the hollow cylindrical body (22) for placing the two exhaust gas lines (4a, 4b) into communication with each other when the valve body is in a position in which the connecting recess (28) is disposed over the two openings (23a, 23b) of the exhaust gas lines (4a, 4b), said connecting recess (28) and the communication opening (24a, 24b) being arranged at different angular locations of the valve body (22), the connecting recess (28) being sealingly separated from the valve body interior, and having the form of a connecting trough on the valve body outer casing set back in relation to the peripheral surface of the valve body.

2. The internal combustion engine as claimed in claim 1, wherein the bypass valve (18) is integrated into the valve device (14).

3. The internal combustion engine as claimed in claim 1, wherein an exhaust gas recirculation device (9) having a recirculation pipe (10) is provided between one of the two exhaust pipes (4a, 4b) and an engine intake line (6).

4. The internal combustion engine as claimed in claim 1, wherein the exhaust gas turbine (3) has a variable turbine geometry (13) for variably controlling the effective turbine inlet cross-section.

* * * * *